United States Patent [19]

Johnson et al.

[11] Patent Number: 5,621,729
[45] Date of Patent: Apr. 15, 1997

[54] RECEIVER CONTROLLED COMMUNICATION SYSTEM

[75] Inventors: Jack J. Johnson; William F. Coyle, both of Summit, N.J.

[73] Assignee: Geophonic Networks, Inc., Summit, N.J.

[21] Appl. No.: 480,201

[22] Filed: Jun. 7, 1995

[51] Int. Cl.⁶ .............................. H04L 12/14; H04L 12/16
[52] U.S. Cl. ........................... 370/62; 370/110.1; 348/13; 379/95; 379/211; 379/212
[58] Field of Search ................................ 370/60, 60.1, 62, 370/79, 94.1, 94.2, 110.1; 379/95, 201, 56, 57, 58, 59, 211, 212; 348/13

[56] References Cited

U.S. PATENT DOCUMENTS

| | | | |
|---|---|---|---|
| 3,931,479 | 1/1976 | Warman et al. | 179/37 |
| 4,095,050 | 6/1978 | Beachem et al. | 179/2 A |
| 4,178,475 | 12/1979 | Taylor et al. | 179/2 EC |
| 4,761,808 | 8/1988 | Howard | 329/95 |
| 5,047,923 | 9/1991 | Elstaer et al. | 364/200 |
| 5,206,743 | 4/1993 | Hockman et al. | 358/440 |
| 5,235,433 | 8/1993 | Clarkson et al. | 358/434 |
| 5,287,456 | 2/1994 | Rhodes et al. | 395/200 |
| 5,287,498 | 2/1994 | Perelman et al. | 395/600 |
| 5,327,554 | 7/1994 | Palazzi, III et al. | 395/600 |
| 5,351,136 | 9/1994 | Wu et al. | 358/440 |
| 5,365,582 | 11/1994 | Yamada et al. | 379/265 |
| 5,369,707 | 11/1994 | Follendore, III | 380/25 |
| 5,375,240 | 12/1994 | Grundy | 395/700 |
| 5,379,421 | 1/1995 | Palazzi, III et al. | 395/600 |
| 5,436,957 | 7/1995 | McConnell | 379/88 |

*Primary Examiner*—Russell W. Blum
*Attorney, Agent, or Firm*—Allen N. Friedman

[57] ABSTRACT

In this communications architecture, a receiver or a receiver control entity acting on behalf of the receiver or a group of receivers, controls the communication of voice, data, or video from individual senders. This is accomplished by placing a Registrar between the senders and receivers. Upon an authorized request from a sender to access a receiver, the Registrar issues a vector to the sender and stores the vector in a database. The vector uniquely identifies both the sender and the receiver. Each time the sender wishes to make a voice call or send a data packet or a video transmission to a particular receiver, the corresponding vector is sent to the switch as the receiver's address. The switch sends the vector to the Registrar for call treatment instruction. A control computer in the Registrar queries the Registrar's database to see whether the receiver identified by the vector has sent the Registrar a call treatment instruction to supersede the default "valid" state and to determine the receiving device address to which the call, packet or video transmission should be sent. The Registrar's control computer then sends an appropriate instruction to the switch, and the switch directs the call, packet or video transmission to the device specified by the receiver.

20 Claims, 9 Drawing Sheets

RECEIVER CONTROLLED COMMUNICATION SYSTEM

BACKGROUND OF THE INVENTION

1. Field of the Invention

The invention is in the field of communications networks.

2. Description of the Background Art

There are several communications technologies in which the called party subscribes to a specialized service and pays for all incoming calls. These are both two way systems, such as cellular telephone service, and one way systems, such as paging. In these systems, once the subscriber has given his electronic address (e.g. telephone number) to a caller or sender, that person can place calls to the subscriber until the subscriber changes that address for everyone.

Communications carriers can restrict access to their networks through the use of access codes or PINs (personal identification numbers). U.S. Pat. No. 4,189,475, issued Dec. 11, 1979 discloses one way of limiting access to a paging system to those callers that can supply a properly coded signal.

In many situations it would be desirable for the called party (or receiver) to be able to control, on an individual basis, who can have access to his pager, cellular telephone or other communications terminal device. For example, in the financial industry, investment portfolio managers for large financial institutions are, often, besieged by calls from securities sales representatives who want to present new investment opportunities. The portfolio manager may have established relationships with a small set of representatives, based on prior experience. Those managers would find it helpful if there were some way of subscribing to a cellular telephone or paging service and only permitting that small set of representatives to have direct access to his cellular telephone or pager, and permitting the manager to change the network's treatment of one particular representative without affecting the others' access. These needs are satisfied by the following receiver-controlled communications architecture.

SUMMARY OF THE INVENTION

This inventive communications architecture places control, access, and the conditions of access, such as billing and choice of receiving device, in the hands of the receiver or a control entity acting for the receiver. It enables a number of useful and valuable services in, for example, the finance, advertising, telecommunications, and information distribution industries.

In this communications architecture, a receiver (or a receiver control entity acting on behalf of the receiver or a group of receivers), controls the communication of voice or data from individual senders. This is accomplished by placing a Registrar between the senders and receivers. Upon an authorized request from a sender to access a receiver, the Registrar issues a vector to the sender (or to a sender control entity acting on behalf of a sender or a group of senders) and stores the vector in a database. The vector uniquely identifies both the sender and the receiver. Each time the sender wishes to make a voice call or send a data packet or video transmission to a particular receiver, the corresponding vector is sent to the switch. The switch sends the vector to the Registrar for call treatment instruction. A control computer in the Registrar queries the Registrar's database to see whether the receiver identified by the vector has sent the Registrar a call treatment instruction to supersede the default "valid" state and to determine the receiving device address to which the call, packet or transmission should be sent. The Registrar's control computer then sends an appropriate instruction to the switch, and the switch directs the call, packet, or transmission to the device specified by the receiver (or blocks the call, packet, or transmission, if directed to do so). The Registrar's control computer can also send an appropriate billing instruction to the switch or to the telecommunications carrier to indicate whether the sender or receiver is to be billed for this call, packet, or transmission. The sender can request the Registrar to generate a group vector to permit the sender to broadcast a packet or transmission to a specified group of receivers. The switch can be associated with the Registrar or belong to another entity, such as a communications carrier. An example of the use of this architecture is in the finance industry where a portfolio manager could carry a pager that provides contact with a number of sales representatives. Since there are many representatives seeking instant access to the portfolio manager, the manager can control that access using the above communications architecture and have the cost of sending the message billed to the representatives.

This architecture can also be used to control advertisers' access to automated electronic display signs controlled by a display service provider. The signs, owned or controlled by the display service provider, are the receivers in this architecture, the service provider acting as a receiver control entity. The service provider controls which advertisers can place their messages on which electronic display signs by instructing the registrar on the treatment of each vector representing a relationship between one advertiser and one sign.

In the same way, advertisers can access individual households' interactive television monitors, controlled through the interactive television service provider (which may be an extension of cable television service). Each household can maintain control over the selection of advertisers appearing on its monitors by directing the service provider to block the vector of whichever advertiser it does not wish to view.

A cellular telephone carrier can use this architecture to offer a service to its customers enabling the customer to designate specific callers to be billed for cellular transmission charges. This service can be instituted using the vector state index, stored in the registrar, to cause the control computer to generate such a billing instruction to the switch or to the carrier, wherever the billing function is located.

The following detailed description, as illustrated and exemplified by the figures, further explains the herein disclosed invention.

DETAILED DESCRIPTION OF THE INVENTION

Figure 1:
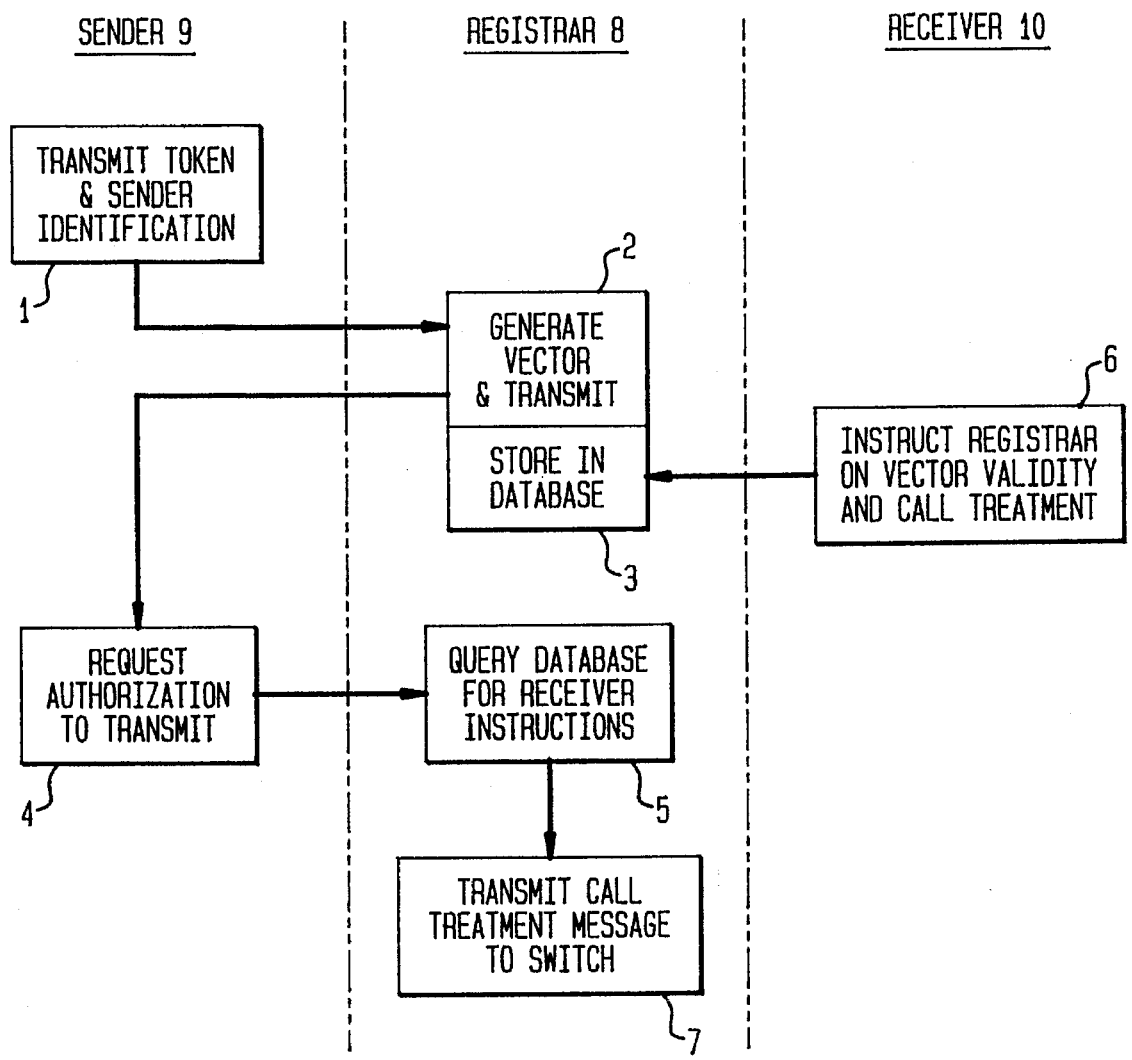
FIG. 1 is a schematic view of an exemplary process of the invention.

The disclosed inventive network architecture accomplishes receiver control of communications access by interposing a registrar between the message senders and the message receivers. The inventive method embodied in the architecture can be implemented to handle voice, data and video messages. FIG. 1 illustrates the function of the registrar in the inventive process. In the process a sender identifies itself and the intended receiver to the registrar, which is a specially programmed computer with a data storage device configured as a database, in one of many ways known to the art. The sender identifies itself with a code number assigned to it by the registrar and identifies the intended receiver with a unique token assigned to the receiver by the registrar and transmitted by the receiver to the sender and to all other senders from whom the receiver may, at least initially, wish to receive messages. The token can be distributed by electronic or by nonelectronic means (such as verbally or on a business card).

In the method illustrated in FIG. 1, a sender that has registered with the registrar and established its identity and given its billing information, received a sender identification code (e.g. a numeric or alphanumeric code). When a sender identifies a prospective receiver and receives its token, the sender transmits the receiver's token and its sender identification code to the registrar 1. The control computer in the registrar generates a vector 2, which is a numeric or alphanumeric code that corresponds to and identifies both the sender and receiver, and transmits it to the sender. The vector can be generated by selecting a random number and associating it with the sender and receiver in a relational database within the registrar 3. Before entering the random number in the database as a vector, it is compared to all prior vectors to avoid duplication. If it has already been used, another will be selected. This relational database will also associate the vector with the several aspects of a vector state index that is under control of the receiver. The vector state index is initially set to its default setting, which states that the vector is valid, permitting transmission, identifies the electronic address of this receiver's primary receiving device, and directs billing to the sender. During the course of receiving messages from the sender, the receiver may, at any time, transmit a direction 6 to the registrar changing any aspect of the vector state index. The receiver may no longer want to accept messages from that sender, it may want to accept billing, or it may want to direct that sender's message to an alternate receiving device, such as a recording device, voice mail, E-mail, or prerecorded message by substituting that electronic address for the address stored in the database.

When the sender requests authorization to send a message 4, the control computer queries the database 5 for call treatment instructions depending on the state of the vector validity index. The computer then transmits those instructions to a switch associated with the registrar. The switch then directs the message in accordance with the receiver's instructions.

If a sender wants to send the same message to several receivers, it may transmit a request for a group vector from the registrar. The sender transmits its own sender identification code and the tokens of all intended receivers to the registrar. The registrar will generate and store a series of vectors, each associated with the requesting sender and one receiver, and will issue the group vector to the sender and store it in the database.

When the group vector is sent to the switch, along with the message, the switch will send it to the registrar, which queries the database 5 for the series of vectors associated with that group vector. The database checks the vector state index of each vector and transmits the corresponding call treatment instructions to the computer, which transmits those instructions to the switch 7.

When a receiver obtains a token from the registrar to transmit to prospective senders, it also obtains a private passcode that identifies the receiver to the registrar when the receiver transmits instructions to change the vector state index of a sender's vector. Using that passcode the receiver has the opportunity to, at any time, change any of the aspects of the vector state index and change the treatment of calls from that sender.

The receiver's primary receiving device may be a one way transmission device, such as a paging receiver or a two way device, such as a cellular telephone. In either case, the switch will pass the electronic address of the receiver's device to the appropriate communications service provider or carrier. The receiver may also have the option of giving its electronic address (e.g., telephone number) directly to some subset of preferred senders (e.g., family member or friends) and forego the control obtained through use of the registrar.

For some types of business relationships a sender or group of senders may interact with the registrar through a sender control entity (or sender controller) that will act on behalf of the sender in obtaining vectors and, perhaps, initially registering with the registrar to obtain a sender identifier code. Similarly a receiver or group of receivers may interact with the registrar through a receiver control entity (receiver controller) in order to transmit vector state index changes.

The following examples will illustrate the possible uses of this versatile process and architecture:

In the financial industry a portfolio manager could carry a pager that provides contact with a number of sales representatives. Since there are many representatives seeking instant access to the portfolio manager, the manager can control that access using the above communications architecture and have the cost of sending the message billed to the representatives.

This architecture can also be used to control advertisers' access to automated electronic display signs controlled by a display service provider. The signs, owned or controlled by the display service provider, are the receivers in this architecture, the service provider acting as a receiver control entity. The service provider controls which advertisers can place their messages on which electronic display signs by instructing the registrar on the treatment of each vector representing a relationship between one advertiser and one sign.

In the same way, advertisers can access individual households' interactive television monitors, controlled through the interactive television service provider (which may be an extension of cable television service). Each household can maintain control over the selection of advertisers appearing on its monitors by directing the service provider to block the vector of whichever advertiser it does not wish to view.

A cellular telephone carrier can use this architecture to offer a service to its customers enabling the customer to designate specific callers to be billed for cellular transmission charges. This service can be instituted using the vector state index, stored in the registrar, to cause the control computer to generate such a billing instruction to the switch or to the carrier, wherever the billing function is located.

Figure 2:
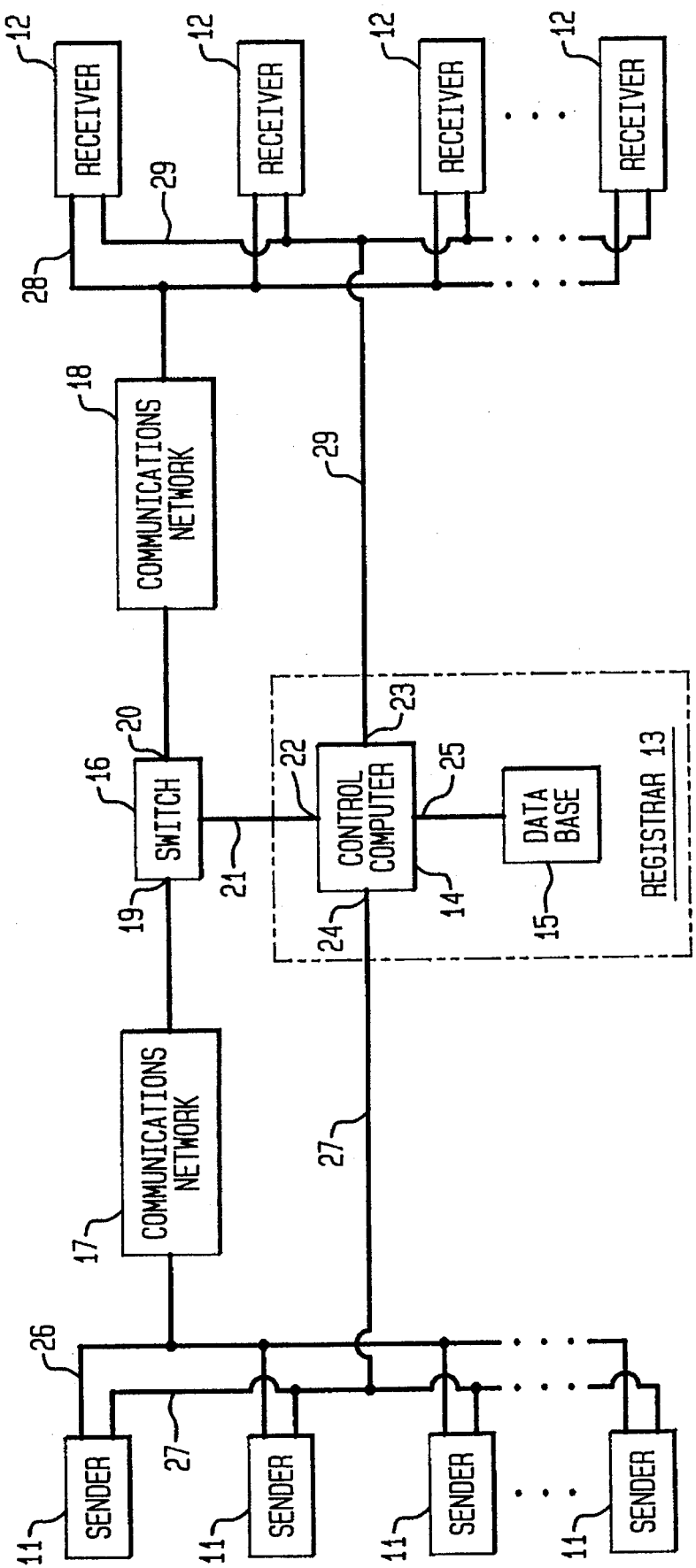
FIG. 2 is a schematic view of a communication network of the invention in which one or more senders sends messages to one or more receivers under receiver control through a registrar.

FIG. 2 shows a communication network in which a group of senders 11 is communicating with a group of receivers 12 over a network including the interposition of a registrar 13 between the senders 11 and the receivers 12. The registrar 13 includes a control computer 14 and a database 15. The control computer 14 communicates with the database 15 through a fourth data channel 25. It communicates with the sender through a third data channel 24 and to the receivers through a second data channel 23. The control computer 14 sends and receives messages as digital bit streams through input and output ports according to communications protocols widely known in the art. The network also includes a switch 16 for directing messages from the senders 11 to the receivers 12. The control computer communicates with the switch through a first data channel 22. The switch has an input port 19 for receiving messages and output port 20 for transmitting messages to the receivers. The senders communicate with the switch over a communication path 26 which may pass through a communication network 17 such as the public switch network. The senders 11 communicate with the control computer over a communication path 27 which may be direct as shown in FIG. 2 or may also pass through a communication network. The receivers 12 communicate with the control computer over a communication path 29 which may be direct as shown or through a communication network. The control computer 14 can query the database 15 for analysis of message traffic data and preparation of reports for billing purposes. The switch 16 sends messages to the receivers through a communication network 18 provided by the communications service provider subscribed to by the receivers, and can include a sender code associated with the message. The database 15 may contain means for storing usage data, including how many times a particular sender 11 transmits a particular vector to the switch 16 and the size of each message sent by that sender 11 to the corresponding receiver 12.

Figure 3:
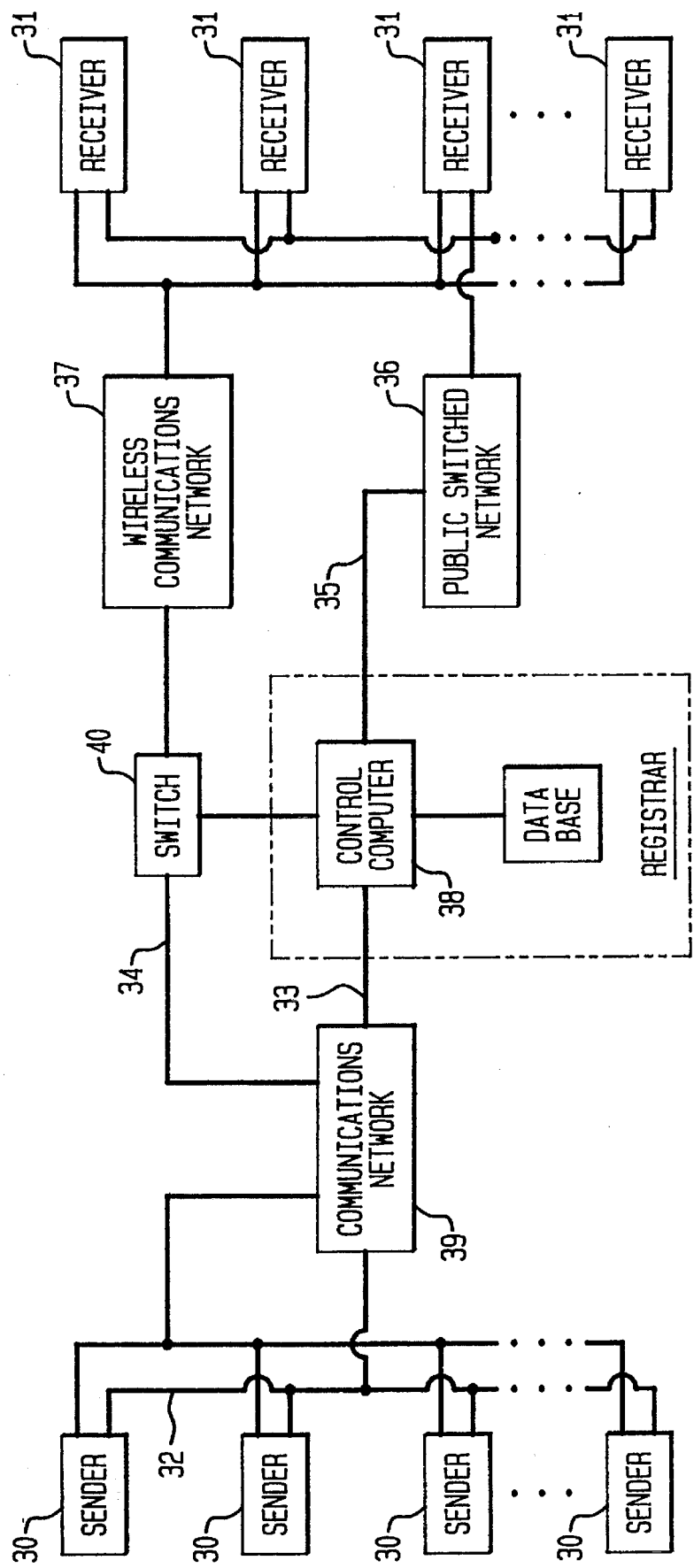
FIG. 3 is an exemplary communication network of the invention in which the senders and the receivers communicate with the registrar through communications networks.

FIG. 3 illustrates a network in which the senders 30 communicate with the control computer 38 over a path 32 passing through the same communication network 39 as is used to send the messages to the switch 40. However, the messages to the control computer 38 are separately addressed to pass over the communication path 33 to the control computer 38. FIG. 3 also illustrates the fact that messages from the switch 40 to the receivers 31 may pass through one communication network such as a wireless communication network 37 while the receivers 31 communicate with the control computer 38 over a path 35 which passes through a separate network 36 such as the public switched network.

Figure 4:
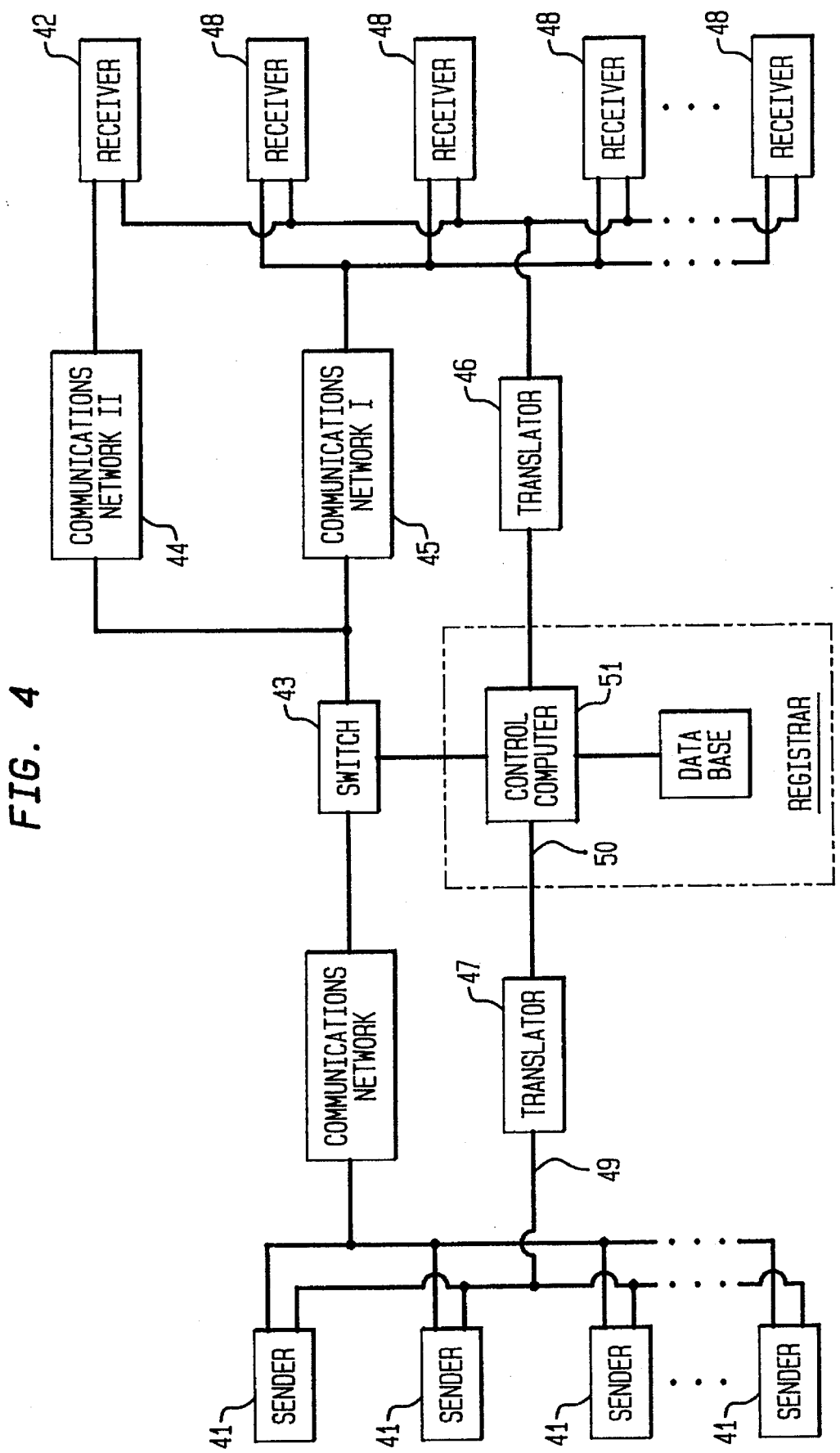
FIG. 4 is an exemplary communication network of the invention in which the switch directs messages to the receivers through two alternate communication networks to which the various receivers subscribe and incorporates translators between the registrar and the senders and receivers.

In FIG. 4 messages from senders 41 to receivers 42 are transmitted from the switch 43 to the receiver 42 through one communication network 44 while messages from senders 41 pass from the switch 43 to the other receivers 48 over a separate communication network 45. FIG. 4 also illustrates that there may be the requirement for some translation device or translation function that makes signals from the senders 41 over the communication path 49 suitable for receipt by the control computer over the third data channel 50. A translator 47 may be a device such as an interactive voice response system or a human operator keying the appropriate information received from the senders 41 into appropriate data form for receipt by the control computer 51. Similarly a translation function or translation device 46 may need to be interposed between the receivers 42, 48 and the control computer 51.

Figure 5:
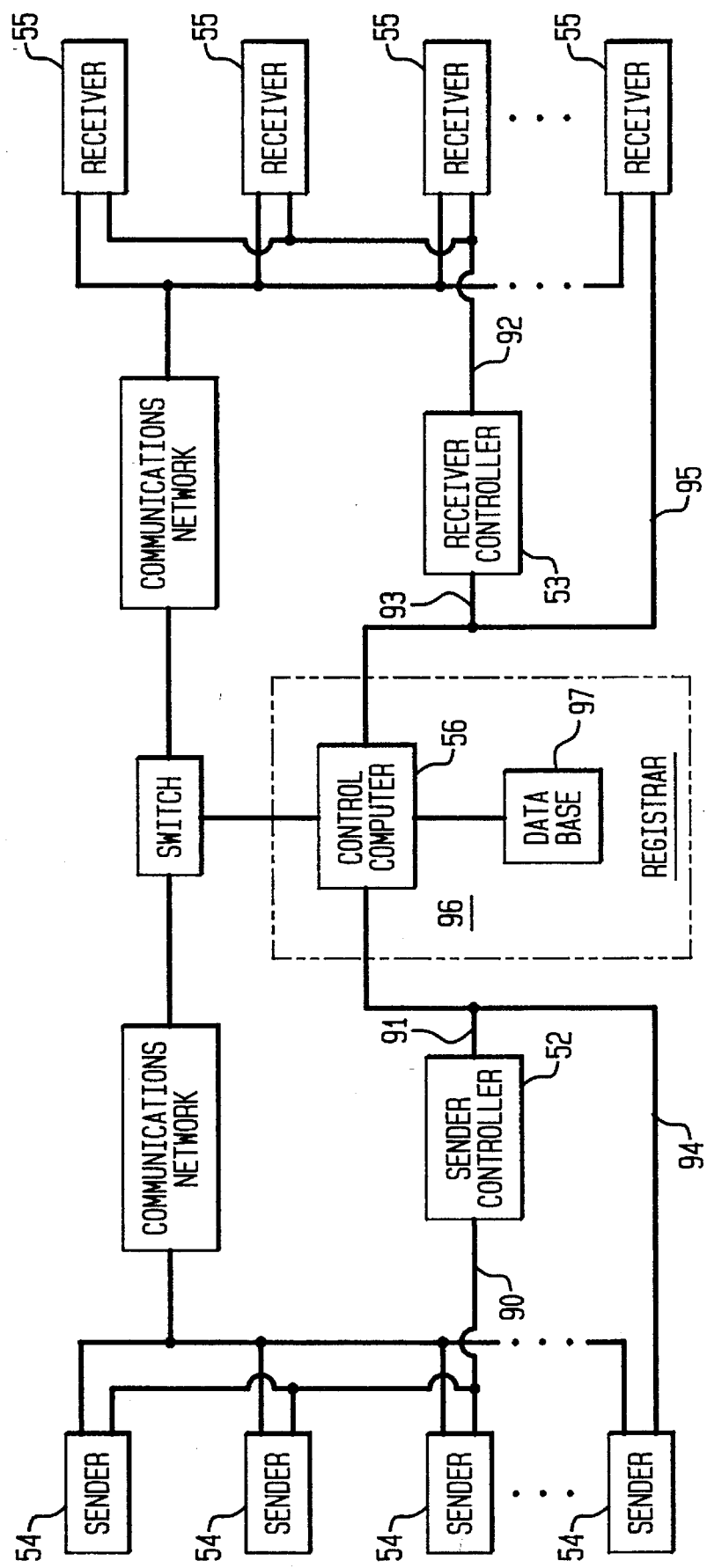
FIG. 5 is an exemplary communication network in which a sender controller acts on behalf of a group of senders in communicating with the control computer and a receiver controller acts on behalf of a group of receivers in communication with the control computer.

FIG. 5 illustrates the use of a sender controller 52 and a receiver controller 53. The sender controller acts on behalf of a group of senders 54 in communicating with the control computer 56. The receiver controller 53 acts on behalf of a group of receivers 55 in communicating with the control computer 56. The senders 54 individually wish to communicate with one or more of the receivers 55. Each sender 54 will obtain from the registrar 96 a set of vectors, each vector corresponding to one of the receivers 55. The senders 54 may communicate with the registrar 96 either individually over a communication path 94 or as a group over a communication path 90 through the sender controller 52. The sender controller 52 will establish the relationship with the registrar 96, transmitting such things as billing data and obtaining vectors. The receivers 55 are controlled by the receiver controller 53. The receiver controller 53 will transmit call handling instructions relating to each sender 54 and each individual receiver 55 to the control computer 96 for storage in the database 97 as the vector state identifier corresponding to the relationship between each individual sender 54 and each individual receiver 55.

Figure 6:
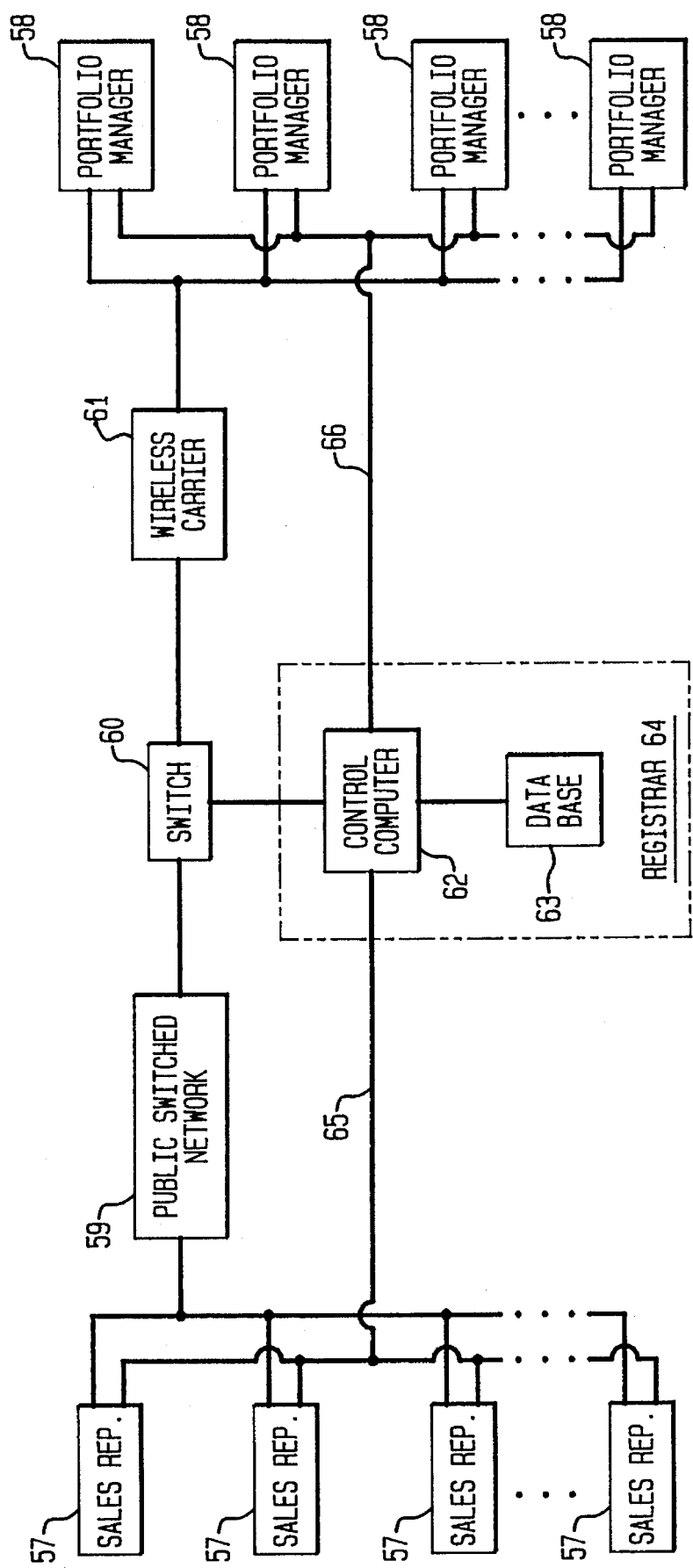
FIG. 6 is an exemplary communication network of the invention in which portfolio managers control the access of sales representatives to their wireless communicators by sending instructions to the registrar.

FIG. 6 illustrates the application of the inventive communication architecture to the finance industry. In this example, portfolio managers 58 have transmitted their receiver tokens to sales representatives 57. The sales representatives obtain vectors from the control computer 62 by means of the communication path 65 and transmit those vectors through the public switch network 59 together with the messages they wish to transmit to the switch 60. The portfolio managers have transmitted call handling instructions to the control computer 62 over the communication path 66. These call handling instructions are stored in the database as a vector state index for each of the vectors that represent a relationship between one of the sales representatives 57 and one of the portfolio managers 58. Any individual portfolio manager 58 may at any time instruct the control computer 62 to change the vector state index for a vector representing the relationship between that individual portfolio manager 58 and one individual sales representative 57. If the portfolio manager 58 no longer wishes to receive any messages from a particular individual sales representative 57, it can instruct the control computer 62 to change that vector state index in the database 63 to a blocking or invalid condition or it may include an instruction that directs the switch 60 to direct messages from that sales representative to an alternate receiving device.

Figure 7:
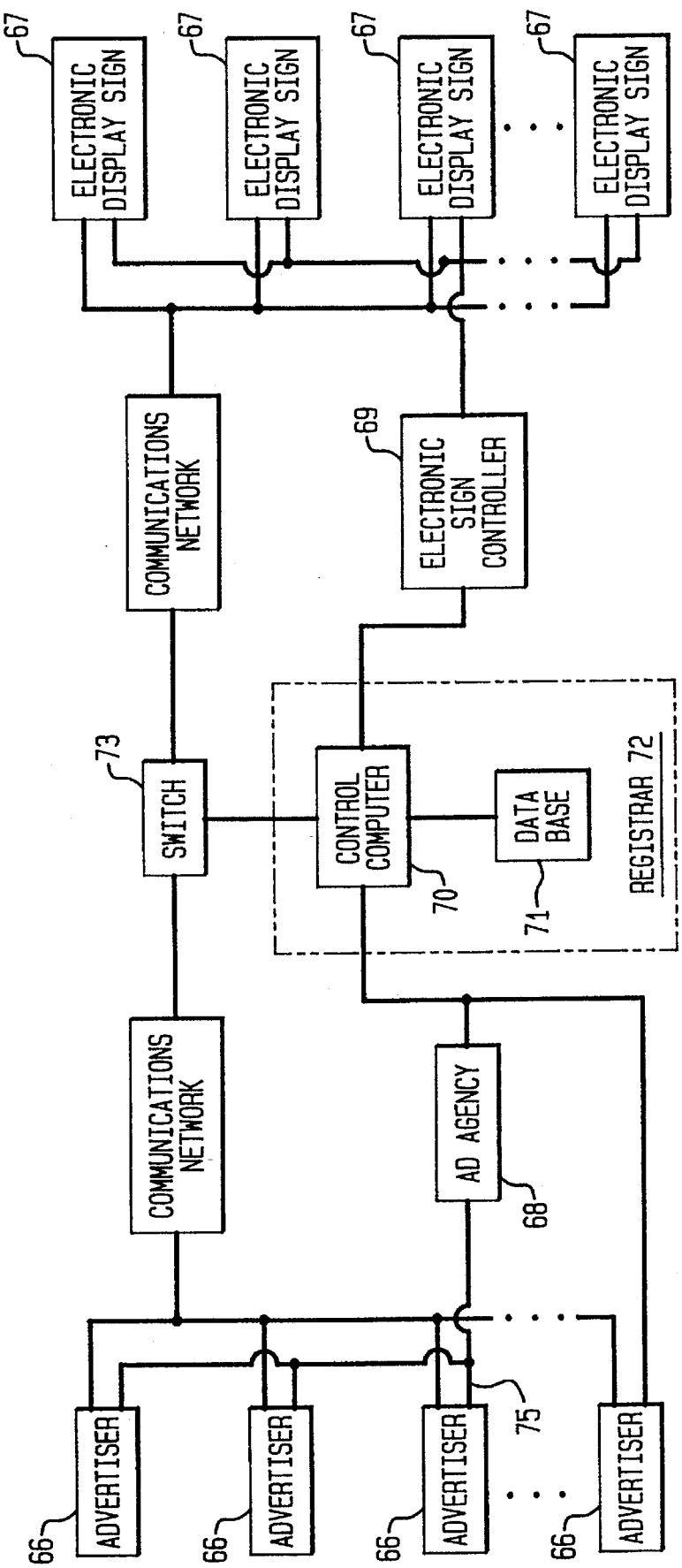
FIG. 7 is a schematic view of an exemplary communication network of the invention in which an electronic sign controller controls the access of individual advertisers to individual electronic display signs by communicating with the registrar on behalf of the signs.

FIG. 7 illustrates one use of the inventive communication network in the advertising industry. A group of advertisers 66 individually wish to place their advertisements on one or more electronic display signs 67. Each advertiser 66 will obtain from the registrar 72 a set of vectors, each vector corresponding to one of the electronic display signs. The advertisers 66 may communicate with the registrar 72 either individually over a communication path 74 or as a group over communication path 75 through an advertising agency 68 that acts as the sender controller for the group using the advertising agency 68. The advertising agency 68 will establish the relationship with the registrar transmitting such things as billing data and obtaining vectors. The electronic display signs 67 are owned or controlled by an electronic sign controller 69. The controller 69 will transmit call handing instructions relating to each individual advertiser and each individual sign to the control computer 70 for storage in the database 71 as the vector state identifier corresponding to the relationship between each individual advertiser 66 and each individual electronic display sign 67. The electronic sign controller 69 can also make available to the advertisers 66 and the advertising agency 68 a directory either in paper or electronic form of the location of each of the electronic display signs 67. Using a demographic profile describing the location of each of the signs the advertiser 66 makes a decision concerning which of its advertisements it wishes to place on which sign. Once that decision is made, the advertiser 66 can request a group vector. It can assign to each of its advertisements the group vector defining the set of electronic display signs to which that advertising message is to be sent. That group vector is sent to the switch 73 along with the advertising message. The group vector is sent by the switch to the registrar 72 in which the control computer 70 accesses the database 71 for call handing instructions corresponding to each of the individual vectors associated with the group vector. The electronic sign controller 69 can direct the control computer 70 to change the call handling instructions corresponding to any individual advertiser 66 to, for example, block advertising messages from any advertiser if that advertiser does not pay its bills or if the proprietor at any one of the electronic display sign locations indicates that it no longer wishes to receive advertising from some particular advertiser.

Figure 8:
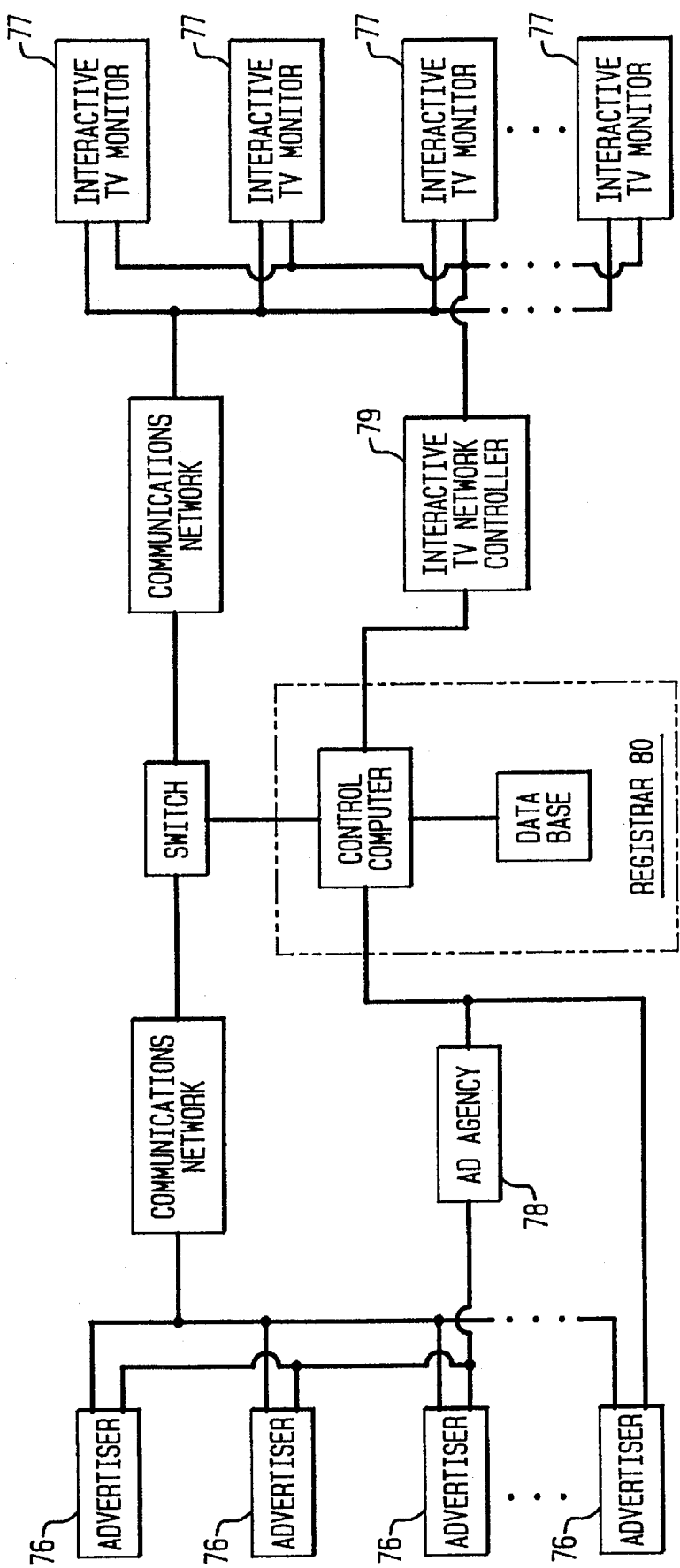
FIG. 8 is an exemplary communication network of the invention in which an interactive TV network controller controls the access of advertisers to the interactive TV monitors as directed by the subscriber to the interactive television service.
Figure 9:
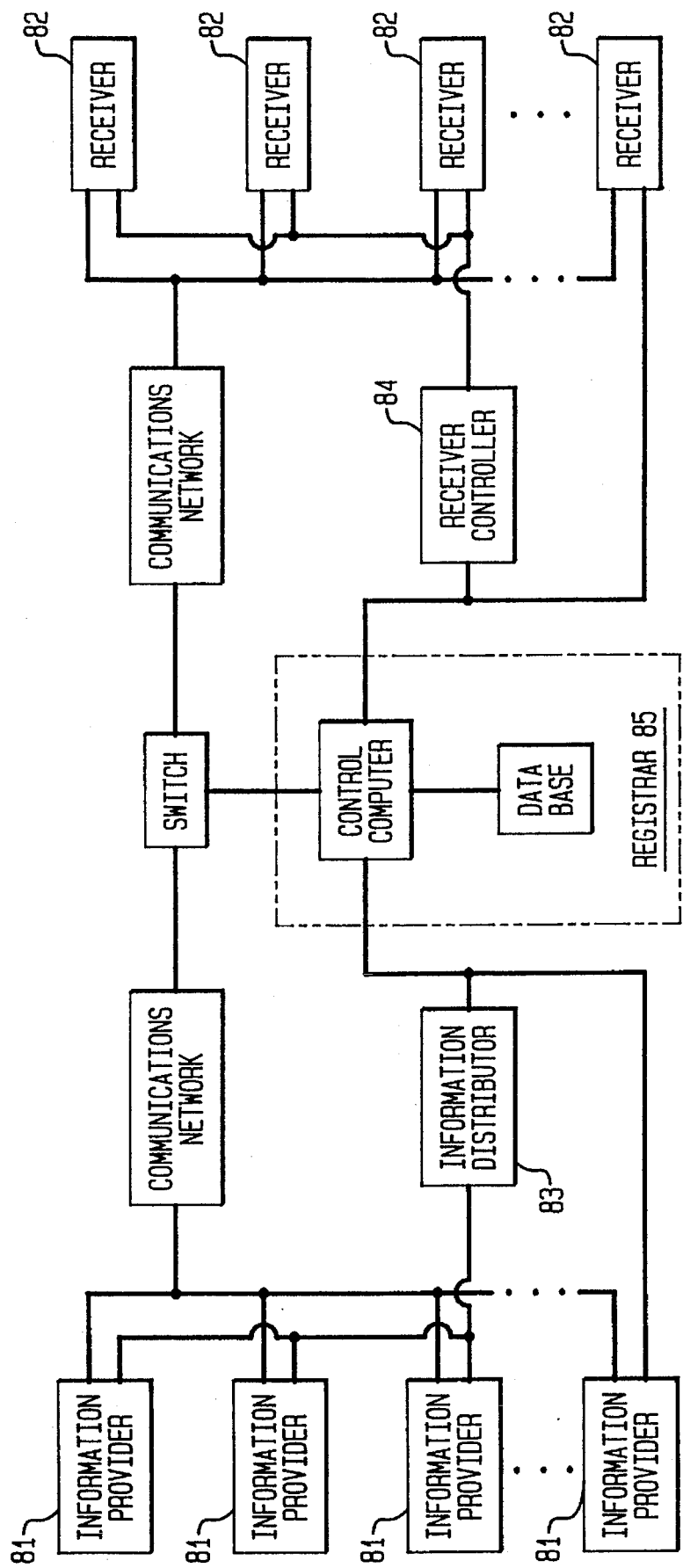
FIG. 9 is a schematic view of an exemplary communication network of the invention in which information providers send messages to receivers as controlled by instructions from the receivers to the registrar with the possible assistance of a receiver controller.

FIG. 8 illustrates the fact that the messages handled by this communications architecture are not limited to voice or data messages but could indeed include video messages as transmitted over an interactive television network or any other video network or personal computer network in which the individual video monitors or personal computers can be individually addressed. The advertisers 76 may act individually or through an advertising agency 78 and the interactive television monitors 77 interact with the registrar 80 through an interactive television network controller 79 from whom they obtain service. More generally as illustrated in FIG. 9 any information providers 81 can communicate with receivers 82 over a network embodying the inventive architecture with each receiver 82 retaining control over the selection of information providers from which it desires to obtain messages. The information providers can interact with the network either individually or through an information distributor.

What is claimed is:

1. Within an electronic communications network for transmitting a message from at least one sender to at least one receiver over a transmission path including a telecommunications carrier, a registrar comprising:

a. a switch with a least one input port for receiving the message, at least one output port for transmitting the message, switching means for directing the message from the at least one sender to the at least one receiver in response to a first vector transmitted to the switch by a first sender of the at least one senders, the first vector representing a first sender identifier and a first receiver token;

b. a control computer with at least one first data channel, at least one second data channel, at least one third data channel, at least one fourth data channel, and means for generating the first vector representing the first sender identifier and the first receiver token, the control computer including means for communicating with the switch through the at least one first data channel, communicating with the at least one receiver through the at least one second data channel, for determining the state of the first vector, the state of the first vector being under control of the receiver corresponding to the first receiver token, communicating with the at least one sender through the at least one third data channel, for receiving the sender identifier and the receiver token, and transmitting the first vector to the sender; and c. a database communicating with the control computer through at least one fourth data channel, including means for storing the first vector and vector state information received from the control computer, and responding to state determination queries from the control computer.

2. A registrar of claim 1 including means for sending to the switch a billing instruction corresponding to the state of the first vector.

3. A registrar of claim 1 including means for sending to the telecommunications carrier billing instructions corresponding to the state of the first vector.

4. A registrar of claim 1 in which the input port is connected to the public switched network and the output port is connected to at least one telecommunications carrier selected from the group consisting of a wireless carrier, a wireline carrier, a facsimile carrier, an e-mail carrier, and a private network.

5. A method of controlling a communications network including controlling the ability of at least one sender to transmit a message to at least one receiver, including use of a computer controlled registrar and a switch, comprising the steps of:

a. passing a unique first receiver token generated by the registrar and a first sender identifier from a first sender of the at least one senders to the registrar;

b. generating, by means of a computer within the registrar, a first vector uniquely related to the first sender identifier and to a first receiver identifier corresponding to the first receiver token, transmitting the first vector to the first sender, and storing the first vector in a database together with the first vector state index, the state of the first vector state index being under control of a first receiver of the at least one receivers;

c. requesting the registrar to authorize the first sender to send the message to the first receiver by transmitting the message and the first vector to the switch and transmitting the first vector from the switch to the registrar;

d. querying the data base to determine the state of the first vector state index; and e. sending a message from the registrar to the switch directing transmission of the message from the first sender to the first receiver in accordance with the state of the first vector state index.

6. A method of claim 5 including passing a plurality of receiver tokens, each token being unique to one receiver, from the first sender to the registrar and generating a group vector representing a plurality of vectors, each vector being uniquely related to the first sender identifier and one receiver token corresponding to one receiver of the plurality of receivers, storing the group vector in the database, together with the vector state index of each of the plurality of vectors and authorizing transmission from the first sender to each of the plurality of receivers, as directed by the state of each vector state index.

7. A method of claim 5 including sending a message from the first receiver to the computer changing the state of the first vector state index from a first state to a second state.

8. A method of claim 7 in which the first state indicates a valid vector and the second state indicates an invalid vector.

9. A method of claim 7 in which the first state indicates transmission to a paging device designated by the first receiver and the second state indicates transmission to an alternate receiving device designated by the first receiver.

10. A method of claim 7 in which the first state indicates transmission to a cellular telephone designated by the first receiver and the second state indicates transmission to an alternate receiving device designated by the first receiver.

11. A method of claim 7 in which the first state indicates transmission to a computer with a modem designated by the first receiver and the second state indicates transmission to an alternate receiving device designated by the first receiver.

12. A method of claim 7 in which the first state indicates transmission to a receiving device designated by the first receiver and the second state indicates blockage.

13. A method of claim 5 including sending an instruction from a receiver control entity to the computer changing the state of the first vector state index from a first state to a second state acting on behalf of the first receiver.

14. A method of claim 5 including transmitting a first receiver token from the first receiver to the first sender.

15. A method of claim 5 including passing the first receiver token from the first sender to the registrar through a sender control entity acting on behalf of the first sender.

16. A method of claim 5 in which the at least one receiver is a personal computer.

17. Within an electronic communications network for transmitting a message from at least one sender to at least one receiver over a transmission path including a switch and a telecommunications carrier, a registrar comprising:

a. a control computer with at least one first data channel, at least one second data channel, at least one third data channel, at least one fourth data channel, and means for generating a first vector corresponding to a first sender identifier and a first receiver token, the control computer including means for communicating with the switch through the at least one first data channel, communicating with the at least one receiver through the at least one second data channel, for determining the state of the first vector, the state of the first vector being under control of the receiver corresponding to the first receiver token, communicating with the at least one sender through the at least one third data channel, for receiving the sender identifier and the receiver token, and transmitting the first vector to the sender; and b. a database communicating with the control computer through at least one fourth data channel, including means for storing the first vector and vector state information received from the control computer, and responding to state determination queries from the control computer.

18. Within an electronic communications network for transmitting a message from at least one sender to at least one receiver over a transmission path including a telecommunications carrier, a registrar comprising:

a. a switch with a least one input port for receiving the message, at least one output port for transmitting the message, switching means for directing the message from the at least one sender to the at least one receiver in response to a first vector transmitted to the switch by a first sender of the at least one senders, the first vector representing a first sender identifier and a first receiver token;

b. a control computer with at least one first data channel, at least one second data channel, at least one third data channel, at least one fourth data channel, and means for generating the first vector representing the first sender identifier and the first receiver token, the control computer including means for communicating with the switch through the at least one first data channel, communicating with the at least one receiver through the at least one second data channel, for determining the state of the first vector, the state of the first vector being under control of the receiver corresponding to the first receiver token, communicating with the at least one sender through the at least one third data channel, for receiving the sender identifier and the receiver token, and transmitting the first vector to the sender; and c. a database communicating with the control computer through at least one fourth data channel, including means for storing the first vector and vector state information received from the control computer, and responding to state determination queries from the control computer and means for storing usage data, including how many times the first sender transmits the first vector to the switch.

19. A registrar of claim 18 in which the usage data further includes the size of the message transmitted by the at least one sender to the at least one receiver.

20. A method of controlling a communications network including controlling the ability of at least one sender to transmit a message to at least one receiver, including use of a computer controlled registrar and a switch, comprising the steps of:

a. passing a unique first receiver token generated by the registrar and a first sender identifier from a first sender of the at least one senders to the registrar;

b. generating, by means of a computer within the registrar, a first vector uniquely related to the first sender identifier and to a first receiver identifier corresponding to the first receiver token, and storing the first vector in a database together with the first vector state index, the state of the first vector state index being under control of a first receiver of the at least one receivers;

c. requesting the registrar to authorize the first sender to send the message to the first receiver by transmitting the message and the first vector to the switch and transmitting the first vector from the switch to the registrar;

d. querying the data base to determine the state of the first vector state index;

e. sending a message from the registrar to the switch directing transmission of the message from the first sender to the first receiver in accordance with the state of the first vector state index; and f. passing a plurality of receiver tokens, each token being unique to one receiver, from the first sender to the registrar and generating a group vector representing a plurality of vectors, each vector being uniquely related to the first sender identifier and one receiver token corresponding to one receiver of the plurality of receivers, storing the group vector in the database, together with the vector state index of each of the plurality of vectors and authorizing transmission from the first sender to each of the plurality of receivers, as directed by the state of each vector state index.

* * * * *